United States Patent
Scheerder et al.

(10) Patent No.: US 7,935,757 B2
(45) Date of Patent: May 3, 2011

(54) PROCESS FOR MAKING A CATIONIC VINYL OLIGOMER COMPOSITION

(75) Inventors: Jurgen Scheerder, Waalwijk (NL); Emilio Martin, Waalwijk (NL); Gerardus Cornelis Overbeek, Waalwijk (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 12/668,233

(22) PCT Filed: Jun. 24, 2008

(86) PCT No.: PCT/EP2008/058007
§ 371 (c)(1),
(2), (4) Date: Jun. 11, 2010

(87) PCT Pub. No.: WO2009/007232
PCT Pub. Date: Jan. 15, 2009

(65) Prior Publication Data
US 2011/0027602 A1 Feb. 3, 2011

(30) Foreign Application Priority Data
Jul. 12, 2007 (EP) .................................... 07013670

(51) Int. Cl.
C08F 2/28 (2006.01)
C08F 220/34 (2006.01)
C08F 220/10 (2006.01)

(52) U.S. Cl. .................. 524/815; 526/303.1; 525/328.2; 525/329.4

(58) Field of Classification Search ................ 524/815; 526/303.1; 525/328.2, 329.4
See application file for complete search history.

(56) References Cited

U.S. PATENT DOCUMENTS

| 4,215,162 | A | * | 7/1980 | Kunnen et al. | ................ | 427/435 |
| 4,304,703 | A | | 12/1981 | Das | | |
| 5,212,251 | A | | 5/1993 | Lorah et al. | | |
| 7,416,781 | B2 | * | 8/2008 | Niemeier et al. | ............. | 428/323 |

FOREIGN PATENT DOCUMENTS
FR  2 868 425  10/2005
GB  1 350 400  4/1974

* cited by examiner

*Primary Examiner* — Kelechi C Egwim
(74) *Attorney, Agent, or Firm* — Nixon & Vanderhye P.C.

(57) ABSTRACT

A process is described for making an aqueous coating composition comprising a cationic vinyl oligomer comprising the following steps: I. preparation of a cationic vinyl oligomer by solution or bulk polymerization of components: i) 2 to 50 wt % of vinyl monomers bearing amine functional groups selected from the group consisting of non-ionic amine functional groups (a), permanent quaternary ammonium functional groups (b), neutralized amine functional groups (c) and mixtures thereof; and ii) 20 to 98 wt % of Ci to Ci8 alkyl (meth)acrylates; and II. dispersion of the cationic vinyl oligomer in an aqueous medium and neutralization of non-ionic amine functional groups.

15 Claims, No Drawings

PROCESS FOR MAKING A CATIONIC VINYL OLIGOMER COMPOSITION

This application is the U.S. national phase of International Application No. PCT/EP2008/058007 filed 24 Jun. 2008 which designated the U.S. and claims priority to EP Application No. 07013670.0 filed 12 Jul. 2007, the entire contents of each of which are hereby incorporated by reference.

The present invention relates to a process for making an aqueous coating composition comprising a cationic vinyl oligomer, or cationic vinyl oligomer-polymer and inter alia its use as an indoor or outdoor coating on wood substrates.

Most wood types like for example redwood oak, cedar, mahogany, fir, cypress, iroko, white and yellow pine and merbau contain chromophoric constituents such as tannins and lignins. These constituents, often referred to as extractives, are naturally occurring materials, and are especially concentrated in the knots. These extractives can be water soluble or non water soluble. From the standpoint of discolouration the extractives that are water soluble are the most important types. They are extracted from the wood by moisture and migrate through the coating to the coating-air interface where the chromophoric constituents concentrate and can cause discoloration in the form of stains. This is known as extractive bleeding. Knots, especially of many softwood species, contain an abundance of these extractives and as a result, paints applied over these knots have a strong tendency to discolour. This is referred to as knot-bleeding. Cheaper woods like pine and spruce typically contain a lot of these knots and therefore have a great tendency to shown bleeding and staining. This means that large sections of the wood that contain lots of knots cannot be used for certain applications. Therefore, there is a strong interest in finding solutions for locking these chromophoric constituents inside the wood, thereby preventing bleeding.

Wood is typically treated with primers to seal the wood, to improve adhesion of subsequent topcoats and to inhibit the migration of chromophoric constituents. The use of waterborne primers, like for example latex coatings, paints, lacquers and varnishes, generally has disadvantages over conventional solvent based coatings, since the above mentioned chromophoric constituents are water soluble and bleed through the applied coating to discolour and stain the topcoat and lead to formation of dark areas, which is highly undesirable. Waterborne topcoats are found to be severely stained on drying when such primers are used. Repeated applications of the conventional aqueous latex coatings on such woods will not hide these stains.

To prevent bleeding, insulating layers (called primers) may be applied to the surface of the wood before coating. There are specialised products known in the prior art as "blockers of tannin" or "stain inhibitors" which prevent these chromophoric constituents from migrating to the coating surface. Reactive pigments such as zinc oxide or aluminium zirconium phosphosilicate are quite effective but in practice have major drawbacks as they can cause stability issues like an increase in viscosity or gelation or coagulation. Solvent based coatings are typically effective in blocking these chromophoric constituents since these constituents are not solubilised by the coating solvent. However, these coating systems contain solvents which pollute the environment, pose a health risk and may take a long time to dry.

Besides tannins and lignins, other water soluble stains present a similar problem. For example, marks made by children's markers, felt or ballpens and water leakage can all stain a topcoat. Hiding of these stains is highly desirable but is typically not efficiently achieved with conventional aqueous latex paints. The same is true for the hiding of nicotine stains.

EP 1,294,816B1 describes an aqueous binder composition comprising an acrylic copolymer having carboxylic acid and ethylene-urea functionalities in combination with a water soluble transition metal complex.

WO 05/071023 describes a stain blocking waterborne composition comprising an inorganic binder and a stain blocking agent that is inorganic nanoparticles. In both EP 1,294,816B1 and WO 05/071023 the compositions used have a pH of 7 or above. However since most water soluble extractives are acidic, this is most likely to enhance the extractive bleeding rather than reducing it.

Most of these water soluble stains are anionic in nature and can be effectively complexed by cationic materials. This is discussed for example in U.S. Pat. No. 3,847,857. Applications of this concept have been described in U.S. Pat. No. 5,312,863 and U.S. Pat. No. 5,212,251. The aqueous cationic polymers described in U.S. Pat. No. 5,312,863 and U.S. Pat. No. 5,212,251 offer a limited protection against the migration of tannins from the knots to the topcoat and do not effectively hide stains from for instance markers or nicotine. U.S. Pat. No. 4,304,703 discloses polymeric products containing cationic salt groups.

The desired level of protection can be achieved by using two component solventborne systems. However, these systems have high VOC (volatile organic cosolvent) levels and often employ a toxic crosslinkers such as isocyanate or aziridine crosslinkers. This is undesirable from a safety, health and environment point of view and such crosslinkers add to the cost of the final composition.

Therefore, there is a need for new coating compositions that can stop the bleeding of chromophoric constituents like tannins through the coating. Moreover, the composition should be able to hide stains caused by markers, felt or ball point pens, water leakage or nicotine.

We have now found an aqueous cationic vinyl oligomer-polymer coating composition that shows excellent blocking property against bleeding of wood, as tested by a knot-bleeding test. The composition according to the invention also prevents the discolouration of the coating-air interface caused by the migration of chromophoric constituents. The composition may also hide stains caused by markers, felt or ball point pens, water leakage or nicotine.

The aqueous coating composition of the invention may be prepared by first polymerising by solution or by bulk polymerisation vinyl monomers (also known as ethylenically unsaturated monomers) that for example are amine functional but not yet cationic to give an amine functional low molecular weight vinyl oligomer and then making the resultant vinyl oligomer cationic by treating it with an acid. Alternatively vinyl monomers that are already cationic may be used, where in this case the neutralisation with acid is not needed. This cationic vinyl oligomer dispersion may then be used as sole stabiliser for a second phase emulsion polymerisation to prepare a vinyl polymer in the presence of the cationic vinyl oligomer.

According to the invention there is provided a process for making an aqueous coating composition comprising a cationic vinyl oligomer comprising the following steps:

I. preparation of a cationic vinyl oligomer by solution or bulk polymerisation of components comprising:
   i) 2 to 50 wt % of vinyl monomers bearing amine functional groups selected from the group consisting of non-ionic amine functional groups (a), permanent quaternary ammonium functional groups (b), neutralised amine functional groups (c) and mixtures thereof;

ii) 20 to 98 wt % of $C_1$ to $C_{18}$ alkyl (meth)acrylates;
iii) 0 to 30 wt % of styrene based monomers;
iv) 0 to 15 wt % of vinyl monomers bearing hydroxyl functional groups; and
v) 0 to 15 wt % of vinyl monomers different from those from i), ii), iii) and iv);
where i), ii), iii), iv) and v) add up to 100%; and
II. dispersion of the cationic vinyl oligomer in an aqueous medium and neutralisation of non-ionic amine functional groups.

In a second embodiment there is provided a process for making an aqueous coating composition comprising a cationic vinyl oligomer comprising the following steps:
I. preparation of a cationic vinyl oligomer by solution or bulk polymerisation of components comprising:
  i) 2 to 50 wt % of vinyl monomers bearing non-ionic amine functional groups;
  ii) 20 to 98 wt % of $C_1$ to $C_{18}$ alkyl (meth)acrylates;
  iii) 0 to 30 wt % of styrene based monomers;
  iv) 0 to 15 wt % of vinyl monomers bearing hydroxyl functional groups; and
  v) 0 to 15 wt % of vinyl monomers different from those from i), ii), iii) and iv);
  where i), ii), iii), iv) and v) add up to 100%; and
II. dispersion of the cationic vinyl oligomer in an aqueous medium and neutralisation of non-ionic amine functional groups.

In a third embodiment there is provided a process for making an aqueous coating composition comprising a cationic vinyl oligomer comprising the following steps:
I. preparation of a cationic vinyl oligomer by solution or bulk polymerisation of components comprising:
  i) 2 to 50 wt % of vinyl monomers bearing permanent quaternary ammonium functional groups;
  ii) 20 to 98 wt % of $C_1$ to $C_{18}$ alkyl (meth)acrylates;
  iii) 0 to 30 wt % of styrene based monomers;
  iv) 0 to 15 wt % of vinyl monomers bearing hydroxyl functional groups; and
  v) 0 to 15 wt % of vinyl monomers different from those from i), ii), iii) and iv);
  where i), ii), iii), iv) and v) add up to 100%; and
II. dispersion of the cationic vinyl oligomer in an aqueous medium.

In a fourth embodiment there is provided a process for making an aqueous coating composition comprising a cationic vinyl oligomer comprising the following steps:
I. preparation of a cationic vinyl oligomer by solution or bulk polymerisation of components comprising:
  i) 2 to 50 wt % of vinyl monomers bearing neutralised amine functional groups;
  ii) 20 to 98 wt % of $C_1$ to $C_{18}$ alkyl (meth)acrylates;
  iii) 0 to 30 wt % of styrene based monomers;
  iv) 0 to 15 wt % of vinyl monomers bearing hydroxyl functional groups; and
  v) 0 to 15 wt % of vinyl monomers different from those from i), ii), iii) and iv);
  where i), ii), iii), iv) and v) add up to 100%; and
II. dispersion of the cationic vinyl oligomer in an aqueous medium.

In any of the previously described embodiments, neutralisation may be carried out before, during or after dispersion.

In another embodiment according to the invention there is provided a process comprising an additional step III, the preparation of a cationic vinyl oligomer-polymer by emulsion polymerisation of vinyl monomers in the presence of the dispersed cationic vinyl oligomer prepared in step II; and wherein the weight % of the cationic vinyl oligomer is 1 to 70 wt % based on the weight of the cationic vinyl oligomer-polymer.

In yet another embodiment according to the invention there is provided a process comprising an additional step III, the preparation of a cationic vinyl oligomer-polymer by emulsion polymerisation of vinyl monomers in the presence of the dispersed cationic vinyl oligomer prepared in step II, wherein step III comprises the emulsion polymerisation of components comprising:
  i) 0 to 10 wt % of vinyl monomers bearing amine functional groups selected from the group consisting of non-ionic amine functional groups (a), permanent quaternary ammonium functional groups (b), neutralised amine functional groups (c) and mixtures thereof;
  ii) 40 to 100 wt % of $C_1$ to $C_{18}$ alkyl (meth)acrylates;
  iii) 0 to 30 wt % of styrene based monomers;
  iv) 0 to 15 wt % of vinyl monomers bearing hydroxyl functional groups; and
  v) 0 to 20 wt % of vinyl monomers different from those from i), ii), iii) and iv);
  where i), ii), iii), iv) and v) add up to 100%.

Any of the previously described embodiments for the cationic vinyl oligomer may include the optional step III as described above.

One advantage of the aqueous coating composition according to the invention is that the aqueous coating composition according to the invention it is a one component system that doesn't need crosslinking at room temperature.

A vinyl monomer is the commonly known name for an ethylenically unsaturated monomer.

The term vinyl oligomer as used herein includes one vinyl oligomer as well as more than one vinyl oligomer. The term vinyl polymer as used herein includes one vinyl polymer as well as more than one vinyl polymer. The term vinyl oligomer-polymer as used herein includes one vinyl oligomer-polymer as well as more than one vinyl oligomer-polymer. The term monomer as used herein includes one monomer as well as more than one monomer.

By styrene based monomer is meant herein styrene, alpha-methyl styrene or other substituted styrenes.

By an oligomer herein is meant a polymer with a weight average molecular weight Mw of $\leq 100{,}000$ g/mol. Preferably oligomer of the invention has a weight average molecular weight Mw of $\leq 80{,}000$ g/mol and most preferably Mw$\leq 60{,}000$ g/mol. These ranges for the Mw of the oligomer were found to be advantageous for optimising the anti-knot-bleeding properties (such as for example the resistance towards bleeding) such that the discolouration of a topcoat (as is described below in the knot-bleeding test) is prevented or minimised.

The cationic vinyl oligomer preferably has a weight average molecular weight (Mw) in the range of from 1000 to 95,000 g/mol, preferably in the range of from 2000 to 80,000 g/mol and even more preferably in the range of from 5000 to 70,000 g/mol.

Preferably, the PDi, defined as being Mw/Mn, for the cationic vinyl oligomer is in the range of from 1.1 to 8, more preferably 1.3 to 5 and most preferably 1.5 to 3. By Mn is meant the number average molecular weight of the cationic vinyl oligomer.

By a vinyl polymer herein is meant a homo or copolymer derived from the addition polymerisation (using a free radical process) of at least one vinyl monomer.

By cationic vinyl oligomer-polymer herein is meant the preparation of a vinyl polymer in the presence of the cationic vinyl oligomer.

By ambient temperature is meant a temperature which ranges from 10 to 30° C.

The Tg of a polymer and/or oligomer herein stands for the glass transition temperature and is well known to be the temperature at which a polymer changes from a glassy, brittle state to a rubbery state. Tg values of polymers may be calculated using the well-known Fox equation. Thus the Tg, in degrees Kelvin, of a copolymer having "n" copolymerised comonomers is given by the weight fractions W of each comonomer type and the Tg's of the homopolymers (in degrees Kelvin) derived from each comonomer according to the equation:

$$1/Tg = W_1/Tg_1 + W_2/Tg_2 + \ldots + W_n/Tg_n$$

The calculated Tg in degrees Kelvin may be readily converted to ° C.

Preferably the Tg of the cationic vinyl oligomer is in the range of from −50° C. to 150° C., preferably in the range of from 0° C. to 120° C. and most preferably in the range of from 30° C. to 100° C.

Preferably the Tg of the vinyl polymer is $\geq 30°$ C. When low amounts of styrene and hydroxyl functional monomers are used, then preferably the Tg of the polymer is in the range of from −20° C. to 100° C., more preferably between 10° C. and 80° C. and most preferably 30° C. to 65° C.

The ranges disclosed above for the Tg of the cationic vinyl oligomer and the vinyl polymer were found to be most advantageous in optimising the anti-knot-bleeding properties such that discolouration of a topcoat (as is described below in the knot-bleeding test) is prevented or minimised.

The average particle diameter of the cationic vinyl oligomer-polymer is in the range of from 20 to 800 nm, preferably 30 to 500 nm and even more preferably from 40 to 300 nm.

The molecular weights of the oligomers and polymers were determined by using gel permeation chromatography (GPC) using polymethylmethacrylates of a known molecular weight as a standard and hexafluoro isopropanol as a solvent.

The vinyl polymer preferably has a weight average molecular weight $Mw \geq 100{,}000$ g/mol. More preferably, the vinyl polymer has a weight average molecular weight $Mw \geq 120{,}000$ g/mol and most preferably $Mw \geq 150{,}000$ g/mol.

Preferably, the weight % of the cationic vinyl oligomer based on the weight of the cationic vinyl oligomer-polymer is in the range of from 1 to 70 wt %, more preferably from 3 to 60 wt %, even more preferably from 5 to 55 wt %, still more preferably from 10 to 50 wt % and most preferably from 15 to 40 wt %.

Examples of vinyl monomers bearing non-ionic amine functional groups (component i), (a)), which are used to form the cationic vinyl oligomer include but are not limited to N,N-dimethylaminoethyl(meth)acrylate, N,N-dimethylaminohexyl(meth)acrylate, N,N-diethylaminoethyl(meth)acrylate, N-methyl-N-butyl-aminoethyl (meth)acrylate, tert-butylaminoethyl(meth)acrylate, N,N-dimethylaminopropyl (meth)acrylate, 2-(1,1,3,3,-tetramethylbutylamino)ethyl (meth)acrylate, beta-morpholinoethyl(meth)acrylate, 4-(beta-acryloxyethyl)pyridine, vinylbenzylamines, vinylphenylamines, 2-vinylpyridines or 4-vinylpyridines, p-aminostyrenes, dialkyaminostyrenes such as N,N,-diaminomethylstyrene, substituted diallylamines, N-vinylpiperidines, N-vinylimidazole, N-vinylimidazoline, N-vinylpyrazole, N-vinylindole, N-substituted (meth)acryl amides like 2-(dimethylamino)ethyl (meth)acrylamide, 2-(tert-butylamino)ethyl(meth)acrylamide, 3-(dimethylamino)propyl(meth)acrylamide, (meth)acryl amide, N-aminoalkyl(meth)acrylamides, vinyl ethers like 10-aminodecyl vinyl ether, 9-aminooctyl vinyl ether, 6-(diethylamino)hexyl vinyl ether, 5-aminopentyl vinyl ether, 3-aminopropyl vinyl ether, 2-aminoethyl vinyl ether, 2-aminobutyl vinyl ether, 4-aminobutyl vinyl ether, 2-dimethylaminoethyl vinyl ether, N-(3,5,5,-triethylhexyl)aminoethyl vinyl ether, N-cyclohexylaminoethyl vinyl ether, N-tert-butylaminoethyl vinyl ether, N-methylaminoethyl vinyl ether, N-2-ethylhexylaminoethyl vinyl ether, N-tert-octylaminoethyl vinyl ether, beta-pyrrolidinoethyl vinyl ether, or (N-beta-hydroxyethyl-N-methyl)aminoethyl vinyl ether may also be used. Cyclic ureido or thiourea containing ethylenically unsaturated monomers like (meth)acryloxyethyl ethyleneurea, (meth)acryloxyethyl ethylenethiourea (meth)acrylamide ethyleneurea, (meth)acrylamide ethylenethiourea and alike can also be used. Mixtures of amine functional vinyl monomers can also be used. These non-ionic monomers may be made cationic by neutralisation as described below Examples of vinyl monomers bearing permanent quaternary ammonium functional groups (component i), (b)), which are used to form the cationic vinyl oligomer are methacrylamidopropyl trimethylammonium chloride (MAPTAC), diallyl dimethyl ammonium chloride (DADMAC), 2-trimethyl ammonium ethyl methacrylic chloride (TMAEMC) and quarternary ammonium salts of substituted (meth)acrylic and (meth)acrylamido monomers. For the amine functional vinyl monomers that are already cationic, such as the examples of vinyl monomers bearing permanent quaternary ammonium functional groups listed above, neutralisation is not required.

The vinyl monomers bearing already neutralised amine functional groups (component i), (c)), which may used to form the cationic vinyl oligomer are the same as the vinyl monomers bearing non-ionic amine functional groups listed above for component i), a). However, to obtain monomer (c), monomer (a) is treated with acids, preferably with organic acids, prior to being polymerised. In this way the non-ionic amine functional monomers are made cationic prior to polymerisation. This can be done with all or part of the non-ionic amine functional vinyl monomers.

Mixtures of amine functional vinyl monomers that need to be neutralised and permanent quaternary ammonium functional monomers that are already cationic can also be used.

Preferably the amine functional vinyl monomers are selected from the group consisting of dimethylaminoethyl (meth)acrylate, diethylaminoethyl (meth)acrylate, tert-butylaminoethyl (meth)acrylate, dimethylaminopropyl (meth) acrylate and mixtures thereof.

Preferably the cationic vinyl oligomer comprises in the range of from 5 to 40 wt % and even more preferably 10 to 30 wt % of amine functional vinyl monomers.

Examples of $C_1$ to $C_{18}$ alkyl (meth)acrylates (component ii)) include in particular, esters of (meth)acrylic acid of formula $CH_2 = CR^1 COOR^2$ wherein $R^1$ is H or methyl and $R^2$ is optionally substituted alkyl or cycloalkyl of 1 to 18 carbon atoms (more preferably 1 to 8 carbon atoms) examples of which are methyl (meth)acrylate, ethyl (meth)acrylate, butyl (meth)acrylate (all isomers), isobutyl (meth)acrylate, 2-ethylhexyl (meth)acrylate, isopropyl (meth)acrylate, propyl (meth)acrylate (all isomers) and mixtures thereof.

Most preferred monomers for component ii) include methyl (meth)acrylate, ethyl (meth)acrylate, n-butyl (meth) acrylate and mixtures thereof.

Preferably the cationic vinyl oligomer comprises 20 to 98 wt %, more preferably 50 to 95 wt % and even more preferably 70 to 90 wt % of $C_1$ to $C_{18}$ alkyl (meth)acrylates.

The cationic vinyl oligomer may comprise styrene based monomers (component iii)) such as styrene, alpha-methyl styrene or other substituted styrenes.

Preferably the cationic vinyl oligomer comprises less than 15 wt %, more preferably less than 5 wt % and even more preferably 0 wt % of styrene based monomers.

The cationic vinyl oligomer may comprise vinyl monomers bearing hydroxyl functional groups (component iv)) such as hydroxyethyl (meth)acrylate, hydroxybutyl (meth) acrylate, 2-hydroxypropyl (meth)acrylate and their modified analogues like Tone M-100 (Tone is a trademark of Union Carbide Corporation). Preferably the cationic vinyl oligomer comprises from 0 to 6 wt %, more preferably from 0 to 3 wt % and even more preferably 0 wt % of vinyl monomers bearing hydroxyl functional groups.

The cationic vinyl oligomer may comprise monomers (component v)) other than components i), ii), iii) and iv).

Di- or multifunctional monomers can be used. Examples include but are not limited to allyl methacrylate, divinyl benzene, ethylenglycol di(meth)acrylate, butanediol di(meth) acrylate, trimethylolethane tri(meth)acrylate and trimethylolpropane tri(meth)acrylate.

Preferably the cationic vinyl oligomer comprises in the range of from 0 to 2 wt %, and more preferably 0 to 1 wt % of such di- or multifunctional monomers.

Furthermore, vinyl monomers containing carboxylic acid functional groups like ethylenically unsaturated monocarboxylic and/or dicarboxylic acids may also be used, like for example acrylic acid (AA), methacrylic acid (MAA), β-carboxy ethylacrylate (β-CEA), fumaric acid and itaconic acid or other vinyl monomers containing carboxylic acid functional groups and combinations thereof. Preferably the cationic vinyl oligomer comprises in the range of from 0 to 5 wt %, preferably from 0 to 3 wt % and even more preferably from 0 to 1 wt % of vinyl monomers containing carboxylic acid functional groups. More preferably the cationic vinyl oligomer comprises in the range of from 0.1 to 3 wt % of vinyl monomers containing carboxylic acid functional groups. The presence of a small amount of vinyl monomers containing carboxylic acid functional groups in the cationic vinyl oligomer may be beneficial for the sanding properties of the coating containing the cationic vinyl oligomer or cationic vinyl oligomer-polymer, due to their possibility to contribute to the crosslinking of the coating composition. Preferably the vinyl monomers containing carboxylic acid functional groups are selected from (meth)acrylic acid and/or β-carboxy ethylacrylate.

Functional monomers other than amine or carboxylic acid functional monomers can also be used. These include monomers like aceto acetoxy (meth)acrylate, oxazoline, glycidyl or cyclic ureido containing monomers. Preferably the cationic vinyl oligomer comprises in the range of from 0 to 15 wt % and more preferably 0 to 6 wt % of such functional monomers.

The cationic vinyl oligomer and/or vinyl polymer may also contain vinyl monomers which provide an adhesion and/or crosslinking functionality to the resulting coating. Crosslinking is however optional and not an essential part of the invention. Examples of crosslinking mechanisms include but are not limited to Schiff-base crosslinking, amine-acetoacetoxy crosslinking, silane crosslinking, auto-oxidative crosslinking and acid-base crosslinking through the presence of an amine functional monomer in the cationic vinyl oligomer and a carboxylic acid functional monomer in the vinyl polymer (or vice versa). Two-component crosslinking by the addition of for instance isocyanates is possible but not preferred.

Other alkyl methacrylates that do not fall into component ii) and are therefore suitable as component v) include 1,3-butadiene, isoprene, acrylonitronitrile, methacrylonitrile, vinyl halides such as vinyl chloride, vinyl esters such as vinyl acetate, vinyl propionate, vinyl laurate and vinyl esters of versatic acid such as VeoVa 9 and VeoVa 10 (VeoVa is a trademark of Shell), heterocyclic vinyl compounds, alkyl esters of mono-ethylenically unsaturated dicarboxylic acids (such as di-n-butyl maleate and di-n-butyl fumarate).

Examples of typical vinyl monomers to prepare the vinyl polymer in the presence of the dispersed cationic vinyl oligomer include all of the vinyl monomers listed above for the preparation of the cationic vinyl oligomer.

Preferably the vinyl polymer comprises in the range of from 60 to 100 wt %, more preferably 80 to 100 wt %, even more preferably 90 to 100 wt % and most preferably 100 wt % of $C_1$ to $C_{18}$ alkyl (meth)acrylates. Examples of $C_1$ to $C_{18}$ alkyl (meth)acrylates to prepare the vinyl polymer in the presence of the dispersed cationic vinyl oligomer include all of the monomers as listed above for component ii) of the cationic vinyl oligomer.

Preferably the vinyl polymer comprises in the range of from 0 to 10 wt %, preferably 0 to 5 wt % and even more preferably 0 to 2 wt % of amine functional vinyl monomers as described above. Also in this case the amine functional vinyl monomers can be used as such or may be completely or partially treated with organic acid prior to polymerisation.

Preferably the vinyl polymer comprises less than 30 wt %, preferably less than 15 wt %, most preferably less than 5 wt % and especially 0 wt % of styrene based monomers.

Preferably the vinyl polymer comprises less than 15 wt %, preferably less than 8 wt % and most preferably 0 wt % of hydroxyl functional monomers.

Preferably the vinyl polymer comprises less than 30 wt % of styrene based monomers and less than 15 wt % of hydroxyl functional monomers.

Preferably the vinyl polymer comprises in the range of from 0 to 3 wt %, and more preferably 0 to 1 wt % of di- or multifunctional monomers.

Preferably the vinyl polymer comprises in the range of from 0 to 20 wt %, more preferably 0 to 12 wt % and even more preferably 0 to 6 wt % of vinyl monomers containing carboxylic acid functional groups. Preferably the vinyl polymer comprises in the range of from 0.1 to 12 wt % of vinyl monomers containing carboxylic acid functional groups. Preferably the vinyl monomers containing carboxylic acid functional groups are selected from (meth)acrylic acid and/or β-carboxy ethylacrylate.

Although it is preferred that the cationic vinyl oligomer or vinyl polymer comprises none or small amounts (in the ranges given above) of vinyl monomers containing carboxylic acid functional groups, their presence may be beneficial for the stability of the aqueous coating composition due to the introduction of crosslinking in the coating composition; that can be beneficial for improving on sanding of the final (dried) coating.

Functional monomers other than amine or carboxylic acid functional monomers can also be used. These include monomers like aceto acetoxy (meth)acrylate, oxazoline, glycidyl or cyclic ureido containing monomers. Preferably the vinyl polymer comprises in the range of from 0 to 10 wt % and more preferably 0 to 6 wt % of such functional monomers.

Preferably the cationic vinyl oligomer-polymer comprises less than 30 wt %, preferably less than 15 wt % and more preferably less than 5 wt % and most preferably 0 wt % of styrene based monomers, based on the weight of the cationic vinyl oligomer-polymer.

Preferably the cationic vinyl oligomer-polymer comprises less than 15 wt % preferably less then 8 wt % and most preferably 0 wt % of hydroxyl functional monomers, based on the weight of the cationic vinyl oligomer-polymer.

Preferably the cationic vinyl oligomer-polymer comprises less than 30 wt % styrene based monomers and less than 15 wt % of hydroxyl functional monomers, based on the weight of the cationic vinyl oligomer-polymer.

The cationic vinyl oligomer can be prepared by solution or bulk polymerisation. Bulk polymerisation of vinyl monomers is described in detail in EP 0,156,170, WO 82/02387, and U.S. Pat. No. 4,414,370. Solution polymerisation is however the preferred method of preparation.

Solution polymerisation is done in the presence of a free radical initiator soluble in the polymerisation medium. Preferably the initiators are soluble in the solvent used for solution polymerisation.

Typical free radical initiators that are used are for example diazo compounds like azoisobutyronitrile or azodimethylbutyronitril, peroxides like lauryl peroxide, or peroxy esters like tert-amylperoxy 2-ethylhexanoate or tert-butylperoxy 2-ethylhexanoate. The amount of free radical initiator used in solution polymerisation preferably ranges from 0.2 to 5 wt % and more preferably from 0.5 to 3 wt % based on the weight of the vinyl monomers.

During the solution polymerisation some water can be present or water can be added after completion of the monomer feed.

Solution polymerisation can also be done under pressure.

Solution polymerisation typically takes place at temperatures ranging from 50 to 150° C., preferably from 70 to 120° C. Solution polymerisation is typically done at or just below the reflux temperature of the solvent used. After feeding the monomers to the solvent at the reaction temperature, a post-reaction can be done by optionally adding more free radical initiator while keeping the mixture at the reaction temperature. The reaction mixture is held at polymerisation temperature until the free monomer content is below 1 wt % and usually below 0.5 wt %.

In principle any solvent can be used during the solution polymerisation of the cationic vinyl oligomer. A solvent mixture can be used as well. Solvents include but are not limited to monoalkyl ether of ethylene glycol, and diethylene glycol which contain about 1 to 4 carbon atoms in the alkyl group. Solvents include alcohols like methanol, ethanol, isopropyl alcohol, 1-propanol, n-butanol, tert-butyl alcohol, 2-ethoxyl ethanol, 2-butoxyl ethanol and diacetone alcohol. Other solvents include acetone, methyl isobutyl ketone, 2-butanone, butyl acetate, ethyl acetate, tolulene, xylene and white spirit. Preferably the solvent is (partially) water-miscible. Isopropyl alcohol is preferred as such solvent.

Most preferably the solvent is selected from the group consisting of isopropyl alcohol, 1-propanol, n-butanol, tert-butyl alcohol, 2-ethoxyl ethanol, 2-butoxyl ethanol, diacetone alcohol, methyl isobutyl ketone, 2-butanone, butyl acetate and ethyl acetate and mixtures thereof.

When solvents are used, these can be removed (by distillation, steam stripping or other means known in the art) either after the cationic vinyl oligomer has been dispersed by the addition of an aqueous medium (such as acid/water) to, or after the cationic vinyl oligomer dispersion has been used in a second phase polymerisation making the cationic vinyl oligomer-polymer dispersion. When the solvent has been removed (and also when this is not done) it is always possible to post-add solvent afterwards.

Optionally, when preparing the cationic vinyl oligomer by solution polymerisation, a chain transfer agent may be added to control the molecular weight. Suitable chain transfer agents include mercaptans such as n-dodecylmercaptan, n-octylmercaptan, t-dodecylmercaptan, mercaptoethanol, iso-octyl thioglycolate, $C_2$ to $C_8$ mercapto carboxylic acids and esters thereof such as 3-mercaptopropionic acid and 2-mercaptopropionic acid; and halogenated hydrocarbons such as carbon tetrabromide and bromotrichloromethane. Preferably $\leq 10$ wt %, more preferably $\leq 6$ wt %, even more preferably $\leq 3$ wt % and most preferably $\leq 2$ wt % of chain transfer agent based on the weight of vinyl monomers is used. The Mw can also be controlled by adjusting the amount of initiator and/or adjusting the reaction temperature.

Catalytic chain transfer polymerisation (CCTP) can also be used to control the Mw as well as creating terminal ethylenically unsaturated groups. In catalytic chain transfer polymerisation a free-radical polymerisation is carried out using a catalytic amount of a selected transition metal complex acting as a catalytic chain transfer agent (CCTA), and in particular a selected cobalt chelate complex. For example N. S. Enikoloypan et al, J. Polym. Chem. Ed, Vol 19, 879 (1981), discloses the use of cobalt II porphyrin complexes as chain transfer agents in free-radical polymerisation, while U.S. Pat. No. 4,526,945 discloses the use of dioxime complexes of cobalt II for such a purpose. U.S. Pat. No. 4,680,354, EP 0,196,783, EP 0,199,436 and EP 0,788,518 describe the use of certain other types of cobalt II chelates as chain transfer agents for the production of oligomers of ethylenically unsaturated monomers by free-radical polymerisation.

WO 87/03605 on the other hand claims the use of certain cobalt III chelate complexes for such a purpose, as well as the use of certain chelate complexes of other metals such as iridium and rhenium.

In this case the amount of Co catalyst that can be used is preferably between 0 to 500 ppm, more preferably between 5 to 200 ppm, most preferably between 10 to 100 ppm based on the vinyl monomers.

The cationic vinyl oligomer may be dispersed with an aqueous medium by any of the following methods:
1. by adding (part of the) an acid/water mixture to the cationic vinyl oligomer at temperatures between ambient and the reaction temperature of the solution polymerisation;
2. by first adding (part of the) an acid followed by (part of the) water;
3. or by first adding (part of the) water followed by (part of the) acid;
4. instead of adding a water/acid mixture to the cationic vinyl oligomer, also the cationic vinyl oligomer can also be added to water or water/acid mixture. This can be beneficial in terms of getting a lower viscosity peak during dispersion. This can be done at any temperature between ambient and the reflux temperature of the solvent used for the solution polymerisation.

The cationic vinyl oligomer can be partially or completely neutralised by the addition of acid prior to, during or after the dispersion. Optionally, some solvent and/or surfactant can be added to the aqueous medium to aid dispersion.

Acids that can be used to render non-ionic amine groups cationic include organic acids like for example formic acid, acetic acid, propionic acid, butyric acid, lauric acid and stearic acid, or inorganic acids like phosphoric acid, hydrochloric acid, nitric acid and sulphuric acid. Mixtures of such acids can also be used. The use of organic acids is preferred. Especially neutralisation with organic $C_1$ to $C_6$ monocarboxylic acids is preferred, even more preferred are acetic acid and/or formic acid. Preferably, acids with a pKa less than that of the amine functional monomer are used.

The amine functional group can also be made cationic by reaction with arylating or alkylating agents like alkyl halides and dialkysulfates, for example methyl iodide, methyl bromide, ethyl chloride, benzyl chloride, benzyl bromide and dimethyl sulfates. Alternatively, epichlorohydrin or epoxides like ethylene oxide, propylene oxide or epoxy derivatives of Bisphenol A can be used.

When the amine functional monomers are completely or at least partially neutralised prior to the polymerisation (pre-neutralised), less acid or no acid may be needed to facilitate dispersion. The amount of acid is in such a case may range from 0.2 to 5 equivalents, preferably from 0.4 to 2.5 equivalents, more preferably from 0.75 to 1.5 equivalents and most preferably from 0.8 to 1.2 equivalents on molar basis on the amount of amine functional monomer used.

Preferably the solids content of the cationic vinyl oligomer solution before dispersion is $\geq 40$ wt %, more preferably $\geq 50$ wt % and even more preferably $\geq 60$ wt %.

Normal shear may be used during the dispersion step. High shear can be used if needed. After dispersion, the solid content of the cationic vinyl oligomer dispersion is preferably $\geq 10$ wt % and more preferably $\geq 20$ wt %.

Preferably the solid contents of the cationic vinyl oligomer-polymer is in the range of from 30 to 70 wt %, more preferably 35 to 55 wt % and most preferably 40 to 50 wt % based on the weight of the coating composition.

The pH of the aqueous coating composition obtained by the process of the invention is preferably in the range of from 3 to 7 and more preferably from 4 to 6.

The cationic vinyl oligomer-polymer can be prepared by standard emulsion polymerisation techniques using free radical polymerisation of vinyl monomers, in the presence of the cationic vinyl oligomer. The polymer can be single phase, sequential, multiphase or prepared by gradient polymerisation. If desirable a seed can be used. This seed can be pre-formed.

The free-radical polymerisation can be performed by techniques well known in the art, as for example by emulsion polymerisation. Furthermore the free-radical polymerisation may be carried out as a batch, multi step, semi-continuous or as a gradient (also known as power feed) polymerisation process. Preferably the vinyl polymer is prepared by emulsion polymerisation in the presence of the cationic vinyl oligomer.

Suitable free-radical-yielding initiators include inorganic peroxides such as K, Na or ammonium persulphate, hydrogen peroxide, or percarbonates; organic peroxides, such as acyl peroxides including e.g. benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as Na or K pyrosulphite or bisulphite and iso-ascorbic acid. Metal compounds such as Fe.EDTA (EDTA is ethylene diamine tetracetic acid) may also be usefully employed as part of the redox initiator system. Azo functional initiators may also be used. Preferred azo initiators include azobis(isobutyronitrile), 2,2'-azobis(2-methylbutyronitrile) and 4,4'-azobis(4-cyanovaleric acid). The amount of initiator or initiator system used is conventional, e.g. within the range 0.05 to 4 wt % based on the total vinyl monomers used. Preferred initiators include ammonium persulphates, sodium persulphates, potassium persulphates, azobis(isobutyronitrile), 2,2'-azobis(2-methylbutyronitrile) and/or t-butyl hydroperoxide.

The use of certain vinyl monomers may also generate free-radicals. For example diacetone acrylamide generates free-radicals at temperatures above about 110° C., thereby causing autopolymerisation and thus may negate the need for any additional free-radical initiators.

If desired, after dispersion of the cationic vinyl oligomer or after completion of preparing the final cationic vinyl oligomer-polymer dispersion the solvent can be completely or partially removed by for instance steam stripping or vacuum distillation. Alternatively, the solvent can be removed and then new solvent can be added to the amount required for the intended application.

The amount of organic solvent in the aqueous coating composition is preferably $\leq 30$ wt %, more preferably $\leq 18$ wt % and even more preferably $\leq 10$ wt % by weight of the aqueous coating composition obtained from the process of the invention.

The aqueous emulsion polymerisation to prepare the cationic vinyl oligomer-polymer can be effected using one or more conventional emulsifying agents, these being surfactants. Anionic and non-ionic surfactants and combinations of the two types are preferred.

Suitable surfactants include but are not limited to conventional anionic and/or non-ionic surfactants and mixtures thereof such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates, alkali metal salts of sulphonic acids; fatty alcohols, ethoxylated fatty acids and/or fatty amides, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Non-ionic surfactants include polyglycol ether compounds and preferably polyethylene oxide compounds as disclosed in "Non-Ionic Surfactants—Physical Chemistry" edited by M. J. Schick, M. Decker 1987.

The amount of surfactant is preferably in the range of from 0 to 5 wt %, more preferably 0 to 2 wt %, most preferably 0 to 1 wt %, even more preferably 0 to 0.5 wt % and especially 0 wt % based on cationic vinyl oligomer-polymer solids. If surfactant is used preferably a non-ionic or an amphoteric surfactant should be used.

In principle any other polymers can be present in the aqueous coating composition obtained by the process of the invention, examples include: polyesters, polyamides, polyurethanes, urethane-acrylics, vinyl polymers and mixtures thereof.

The aqueous composition of the invention may contain conventional ingredients; examples include pigments, dyes, plasticisers, thickeners, heat stabilisers, levelling agents, anti-cratering agents, fillers, sedimentation inhibitors, UV absorbers, antioxidants, drier salts, co-solvents, wetting agents, matting agents and the like introduced at any stage of the production process or subsequently. It is possible to include an amount of antimony oxide in the dispersions to enhance the fire retardant properties. The composition of this invention may also contain various other ingredients such as extenders (e.g. calcium carbonate and china clay), dispersants such as pigment dispersion aids, rheology modifiers, biocides, and antifoam agents.

Such additives are commercially available. However, it is to be understood that these additives are not needed to obtain the properties as described in this invention and they are not added when they negatively affect these properties.

In particular the composition of invention may be in the form of (i.e. formulated as) a paint, a varnish or a lacquer for architectural or industrial use for indoor as well as for outdoor applications.

The invention coating compositions may be applied to a wide variety of substrates such as e.g. wood, paper, plastics and plastic films like polyethylene or polypropylene, especially when the films are treated with plasma; fibre (including hair and textile), metal, glass, ceramics, plaster, asphalt, board, leather and concrete. Wood and board are the most preferred substrates. Application to a substrate may be by any conventional method including brushing, dipping, flow coating, spraying, roller coating and pad coating.

The composition once applied may be allowed to dry naturally at ambient temperature and more preferably at a temperature in the range of from 10 to 28° C.

There is further provided according to the invention a substrate carrying a pigmented or non-pigmented primer coating derived from an aqueous coating composition obtained by a process as defined above. Preferably the substrate carries a pigmented topcoat coating derived from an aqueous coating composition obtained by a process as defined above.

There is further provided according to the invention a method of coating a substrate which comprises applying an aqueous coating composition obtained by a process as defined above to a substrate and drying the composition to obtain a coating called a primer. A second paint layer called a topcoat may also be applied on the top of the dried primer coating.

The present invention is now further illustrated but in no way limited by reference to the following examples. Unless otherwise specified all parts, percentages and ratios are on a weight basis. The prefix C before an example number denotes that it is comparative.

In the examples the following abbreviations or trade names are employed:
NeoCryl XK-90=acrylic emulsion available from DSM NeoResins BV
NeoCryl XK-37=acrylic emulsion available from DSM NeoResins BV
Disperbyk 190=non-ionic pigment dispersant from BYK
Tego Foamex 810=defoamer from Tego
Kronos 2190=$TiO_2$ pigment from DuPOnt
Blanc Fixe N=barium sulphate extender, a filler from Solvay
ASP 170=aluminum silicate extender, a filler from Engelhard-BASF
Texanol=2,2,4-trimethyl 1,3-pentanediol monoisiobutyrate, a coalescent from Eastman
Borchigel L75N=a non-ionic thickener from Borchers
Rhodafac RS-710=a phosphate based anionic surfactant available from Rhodia
Disponil AFX4060=a non-ionic surfactant available from Cognis
Nuvis FX1070=a polyurethane thickener available from Sasol Servo
Dehydran 1293=a defoamer available from Cognis
Surfynol 104E=a wetting agent available from Air Products
NeoCryl BT-24=acrylic emulsion, composition available from DSM NeoResins BV.
Tioxide TR92=pigment available from Huntsman
AMP 95=primary amino alcohol and multifunctional amine available from Angus
MMA=methyl methacrylate
BMA=n-butyl methacrylate
MMA=methacrylic acid
EA=ethyl acrylate
BA=n-butyl acrylate
DMAEMA=dimethylamine ethylmethacrylate
IPA=isopropyl alcohol
AIBN=azoisobutyronitrile
LMKT=lauryl mercaptane
iOTG=iso-octyl thioglycolate
3-MPA=3-mercapto propionic acid
iAA=iso-ascorbic acid
tBHPO=tert-butyl hydroperoxide

EXAMPLE 1

Cationic Vinyl Oligomer Preparation and Dispersion into Water

A 2 L three-neck round bottom glass reactor, equipped with a stirrer, $N_2$ inlet, thermometer and baffles was loaded with IPA (320 g). Next, AIBN (4.7 g) was added to the reactor. In a dropping funnel MMA (399.0 g), DMAEMA (70.4 g), LMKT (2.4 g) and (iOTG, 2.4 g) were mixed (the feed was kept at ambient temperature). The temperature was raised to 80° C. At 80° C. the monomer feed was added over a period of 180 minutes. Then, AIBN was added (1.2 g) and the reaction mixture was kept at 80° C. for 60 minutes. The resulting cationic vinyl oligomer solution had a solids content of 60 wt %.

Next, a solution of formic acid (20.6 g) in water (1099.4 g) was added to the reactor and the resulting dispersion was cooled to room temperature. The final cationic vinyl oligomer dispersion had a solids content of 25 wt % and a pH of 5.1 and a Brookfield viscosity of 1020 mPa·s. The aqueous dispersion contained 16.6 wt % IPA. The Mw of the obtained cationic vinyl oligomer was determined by GPC to be 53 kg/mol, and the Mn was 25.2 kg/mol. The calculated Tg of the cationic vinyl oligomer was 89° C.

The knot-bleeding was tested according to the method described below and the results are listed in Table 4 below. Hiding of markers was also tested, as shown below.

Note: all the cationic vinyl oligomers described below were prepared following the same procedure as in example 1. The same amount of chain transfer agent was used for each cationic vinyl oligomer composition, therefore the Mw and Mn of the cationic vinyl oligomers presented below should be in a similar range to the Mw and Mn disclosed for example 1.

EXAMPLE 2

Preparation of a Cationic Vinyl Oligomer-Polymer by Emulsion Polymerisation

A 2 L three-neck round bottom glass reactor, equipped with a stirrer, $N_2$ inlet, thermometer and baffles was loaded with the cationic vinyl oligomer dispersion prepared in example 1 (399.8 g) and water (98.3 g). A monomer feed was prepared from MMA (156.5 g) and BA (89.9 g). An initiator feed was prepared by dissolving iAA (0.7 g) in water (56.0 g). The reactor was heated to 85° C., and tBHPO (1.0 g of a 30 wt % solution) was added. Next, the monomer feed and the initiator feed were added over a period of 90 minutes at 85° C. After completion of both feeds the reaction mixture was kept at 85° C. for 30 minutes. tBHPO (0.8 g of a 30 wt % solution) was added to the reaction mixture followed by a 5 wt % iAA solution (4.7 g) and the reaction mixture was kept at 85° C. for another 30 minutes. Finally, the mixture was cooled, filtered and collected. The final solid content of the aqueous dispersion was 42.5 wt %, the pH was 4.5, the Brookfield viscosity was 114 mPa·s and the particle size was 153 nm. The aqueous dispersion contained 8.1 wt % IPA. The Mw of the obtained cationic vinyl oligomer-polymer was estimated to be higher than 100,000 kg/mol. The calculated Tg of the polymer was 30° C. and the Tg of the cationic vinyl oligomer was 89° C. The cationic vinyl oligomer-polymer contained 55 wt % of cationic vinyl oligomer based on the total weight of the cationic vinyl oligomer-polymer.

The knot-bleeding was tested according to the method described below and the results are listed in Table 4 below. Hiding of markers was also tested, as shown below.

Note: all the cationic vinyl oligomer-polymers described below were prepared following the same procedure as in example 2.

EXAMPLES 3 TO 6

The Effect of Addition of Surfactants to the Cationic Vinyl Oligomer

A cationic vinyl oligomer was prepared according example 1. To this cationic vinyl oligomer Rhodafac RS-710 was added, respectively 0.25 wt % (s/s) for example 3 and 2.0 wt % (s/s) for example 4. Furthermore, to the cationic vinyl oligomer 1.9 wt % (s/s) Disponil AFX4060 was added to give example 5. The addition of 2 wt % dodecyl dimethyl ammonium chloride gave example 6. The results from the knot-bleeding tests are shown in Table 4.

EXAMPLES 7 AND 8

The Effect of Addition of Surfactants on the Cationic Vinyl Oligomer-Polymer To the cationic vinyl oligomer-polymer prepared according to example 2 Rhodafac RS-710 was added, respectively 0.25 wt % (s/s) for example 7 and 2.0 wt % (s/s) for example 8. The results from the knot-bleeding test are shown in Table 4.

EXAMPLES 9 TO 19

Other Effects on the Cationic Vinyl Oligomers

Cationic vinyl oligomers were prepared according example 1 using the compositions listed in Table 1. Examples 9 and 10 included also styrene in the backbone. Examples 11 and 12 included OH functional monomers in the cationic vinyl oligomer backbone. For the cationic vinyl oligomer 13, formic acid was added to the monomer feed containing DMAEMA, thus pre-neutralising the DMAEMA. Examples 14 to 16 show the positive influence of a Tg in a range of 35 to 75° C. Example 17 (and 19) included MAA as vinyl monomer containing carboxylic acid functional groups in the cationic vinyl oligomer backbone. In examples 18 and 19 (similar to example 17), instead of iOTG/LMKT, 3-MPA was used as chain transfer agent. Cationic vinyl oligomers 9-19 were not tested as such for their anti-knot-bleeding properties, but they were used to prepare cationic vinyl oligomer-polymer dispersions (Table 3). All cationic vinyl oligomers (i.e. 1 and 9-19) had a pH from 4 to 5. The knot-bleeding test results are shown in Table 4.

EXAMPLES 20 TO 34

The cationic vinyl oligomers 1 and 9-19 were used to prepare cationic vinyl oligomer-polymers according to example 2 to give examples 20 to 34. Table 3 presents the cationic vinyl oligomers corresponding to the cationic vinyl oligomer-polymers 20 to 34. The monomer compositions of the polymer part of the cationic vinyl oligomer-polymers are shown in Table 2. The specifications of the cationic vinyl oligomer-polymers are listed in Table 3. The knot-bleeding test results are presented in Table 4.

TABLE 2

| Monomer compositions polymer part cationic vinyl oligomer-polymers (wt/wt) | | | | | | |
|---|---|---|---|---|---|---|
| | MMA | BA | MAA | EA | BMA | Tg ° C. |
| Example 20-27 | 65.9 | 34.1 | — | — | — | 31 |
| Example 28 | 61.9 | 35.1 | 3 | — | — | 30 |
| Example 29 | 61.9 | 35.1 | 3 | — | — | 30 |
| Example 30 | 59.2 | 35.8 | 5 | — | — | 30 |
| Example 31 | 52.5 | 37.5 | 10 | — | — | 30 |
| Example 32 | 47.8 | — | 3 | 49.2 | — | 30 |
| Example 33 | 14.7 | — | — | — | 85.3 | 30 |
| Example 34 | 52.2 | — | — | 47.8 | — | 30 |

In Example 28, a cationic vinyl oligomer 17 was used with 1 wt % MAA and 3 wt % MAA was incorporated in the polymer part. Examples 29-31 were prepared using the cationic vinyl oligomer prepared according to example 1 and various amounts of MAA were incorporated into the polymer part. In example 32, an amount of 3 wt % MAA was incorporated into the polymer part and BA was replaced by EA. Example 33 is a cationic vinyl oligomer-polymer having no vinyl monomers containing carboxylic acid functional groups incorporated and having a different vinyl polymer composition. In Example 34, the cationic vinyl oligomer 19 contained 1 wt % MAA and in the polymer part BA was replaced by EA.

COMPARATIVE EXAMPLES 1 & 2

Examples I and II from U.S. Pat. No. 4,304,703 were reproduced. The knot-bleeding was tested according to the method described below and the results are listed in Table 4 below.

TABLE 1

| Monomer compositions cationic vinyl oligomers (wt/wt) | | | | | | | |
|---|---|---|---|---|---|---|---|
| | DMAEMA | MMA | BMA | MAA | HEMA | S | Tg ° C. |
| Example 9 | 15 | 75 | — | — | — | 10 | 89 |
| Example 10 | 15 | 82.5 | — | — | — | 2.5 | 89 |
| Example 11 | 15 | 81 | — | — | 4 | — | 87 |
| Example 12 | 15 | 83 | — | — | 2 | — | 88 |
| Example 13 | 15 | 85 | — | — | — | — | 89 |
| Example 14 | 15 | 21.9 | 63.1 | — | — | — | 35 |
| Example 15 | 15 | 47.7 | 37.3 | — | — | — | 55 |
| Example 16 | 15 | 70.5 | 14.5 | — | — | — | 75 |
| Example 17 | 15 | 84 | — | 1 | — | — | 90 |
| Example 18 | 15 | 85 | — | — | — | — | 89 |
| Example 19 | 15 | 84 | — | 1 | — | — | 90 |

COMPARATIVE EXAMPLE 3

Example 8 from U.S. Pat. No. 5,212,251 was reproduced. The knot-bleeding was tested according to the method described below and the results are listed in Table 4 below.

COMPARATIVE EXAMPLE 4

Example 2 was repeated but now with a polymer composition of MMA/BA 47/53 (wt/wt), giving a calculated (theoretical) Tg for the polymer part of 0° C. The knot-bleeding was tested according to the method described below and the results are listed in Table 4 below.

TABLE 3

Specifications examples 20-34

|  | Cationic oligomer (No. example) | Solids content (%) | pH | Viscosity* (m · Pa · s·) | Particle size (nm) |
|---|---|---|---|---|---|
| Example 20 | 9 | 42.5 | 4.5 | 98 | 133 |
| Example 21 | 10 | 42.5 | 4.6 | 76 | 148 |
| Example 22 | 11 | 42.5 | 4.5 | 230 | 141 |
| Example 23 | 12 | 42.5 | 4.9 | 101 | 156 |
| Example 24 | 13 | 42.5 | 4.6 | 78 | 123 |
| Example 25 | 14 | 42.5 | 4.8 | 173 | 185 |
| Example 26 | 15 | 42.5 | 4.9 | 200 | 210 |
| Example 27 | 16 | 42.5 | 5.1 | 120 | 141 |
| Example 28 | 17 | 42.5 | 4.2 | 95 | 267 |
| Example 29 | 1 | 44.3 | 4.5 | 153 | 270 |
| Example 30 | 1 | 42.5 | 4.3 | 75 | 130 |
| Example 31 | 1 | 42.5 | 3.9 | 49 | 113 |
| Example 32 | 18 | 42.5 | 4.3 | 75 | 259 |
| Example 33 | 1 | 43.3 | 4.6 | 134 | 232 |
| Example 34 | 19 | 42.5 | 4.1 | 127 | 191 |

*The viscosity for the cationic vinyl oligomer - polymer dispersions was measured by means of a Brookfield viscometer under ambient conditions (T = 20 +/− 5° C.) and a shear rate of 60 rpm using spindle II.

Knot-Bleeding Test

The dispersions prepared in the examples above (65.0 g) were formulated with demi water (7.3 g), Disperbyk 190 (1.0 g), Tego Foamex 810 (0.2 g), Kronos 2190 (35.8 g), Blanc Fixe N (7.9 g), ASP 170 (6.7 g), Texanol (5.2 g) and Borchigel L75N (50 wt % in water, approximately 0.4 to 1.4 g) to give a primer.

Freshly cut pine wood panels with dimension 15×6.5 cm² each containing one fresh knot are used. The primer was applied (150 g/m² wet) and dried for 4 hours at room temperature. Then a white pigmented topcoat based on NeoCryl XK-90 (58.8 wt %), Tioxide TR92 pigment (23.8 wt %), ethylenediglycol (4.2 wt %), monopropyleneglycol (2.4 wt %), demineralised water (3.3 wt %), Borchigel L-75N (as a 50 wt % solution in demineralised water) (0.40 wt %), Nuvis FX 1070 (1.40 wt %), Dehydran 1293 (1.4 wt %), Surfynol 104 E (0.40 wt %), AMP 95 (0.20 wt %) and NeoCryl BT-24 (3.10 wt %) was applied to the pine wood panels (100 g/m² wet).

This was allowed to dry for 1 week at ambient temperature. Next the test panels were placed in a QUV cabinet with the coated side facing downwards. The panels were subjected to cycles each consisting of 12 hours UV (B) and 12 hours condensation at 50° C. After each cycle the panels were rated on discolouration determined by the bleeding of the knot. Rating was done on an average of five panels and ranged from 0 (strongly discoloured) to 3 (slightly discoloured) to 5 (no visual change). A maximum of 40 cycles were performed.

The results of the knot-bleeding test are presented in Table 4, where the number of cycles needed to get a rating of 3 and a rating of 0 are given.

Examples 1 and 2 showed that the cationic vinyl oligomers and cationic vinyl oligomer-polymers prepared according to the invention had excellent anti-knot-bleeding properties (i.e, a high number of cycles was needed to reach a rating of 3 and of 0). Examples 3 and 4 show that the addition of even small amount of anionic surfactant to the cationic vinyl oligomer had a negative effect on the anti-knot-bleeding properties (i.e., discolouration was obtained after running a small number of cycles). The addition of a non-ionic surfactant (example 5) or cationic surfactant (example 6) had a strong negative effect on the anti-knot-bleeding properties.

In the case of cationic vinyl oligomer-polymers, the addition of a 0.25 wt % (s/s) Rhodafac RS-710 to the cationic vinyl oligomer-polymer (example 7) had no negative effect and the anti-knot-bleeding properties were very good. However, the addition of 2 wt % (s/s) of Rhodafac RS-710 (example 8) determined a decrease in the anti-knot-bleeding properties. Examples 9 to 17 are related to examples 20 to 28 (see also Table 3) presented below.

The presence of a low amount of styrene or OH functional monomers, up to 10 wt % styrene (S) (example 20-21) or up to 4 wt % hydroxylethyl methacrylate (HEMA) (example 22-23) in the cationic vinyl oligomer as part of an cationic vinyl oligomer-polymer, had a positive effect on the anti-knot-bleeding properties. Pre-neutralising the DMAEMA with formic acid had a positive effect on the anti-knot-bleeding properties (example 24). Theoretical (calculated) Tg's of the cationic vinyl oligomer in the range between 35 and 75° C. also had a positive effect on the anti-knot-bleeding properties (examples 25-27). Table 4 also shows that the presence of MAA (vinyl monomer containing carboxylic acid functional groups) in both the cationic vinyl oligomer and vinyl polymer part (examples 28) or only in the polymer part (examples 29-30) or only in the cationic vinyl oligomer part (example 34) had a positive effect on the anti-knot-bleeding properties. Example 33 is for a cationic vinyl oligomer-polymer having a different polymer composition also showed very good anti-knot-bleeding properties.

Hiding of Markers Test

On a plastered substrate a 120 µm wet film of a wall paint based on NeoCryl XK-37 was applied. This film was allowed to dry 2 hours under ambient conditions (T=20+/−5° C.) followed by ageing at 52° C. during 16 hours. Crayon markers were used to draw horizontal stripes on top of the wall paint. This film was then dried 2 hours under ambient conditions followed by drying for 16 hours at 52° C. Then a 80 µm thick wet film of a paint (prepared as described earlier for the knot-bleeding test) made from the cationic vinyl oligomer or the cationic vinyl oligomer-polymer as described under example 1 and 2 was applied on top of the stained paint using a wire rod. This film was then dried 4 hours under ambient conditions followed by drying for 16 hours at 52° C. The hiding of the markers was rated on a scale from 0 (=no marker visible through the applied paint, complete hiding) to 5 (=no hiding of the markers observed). Examples 1 and 2 were rated 3 and 4 in this test. A traditional topcoat (NeoCryl XK-90) was rated 0. This test is representative for stains caused by felt or ball pens, water leakage and nicotine.

TABLE 4

Knot-bleeding test results

| | Number of cycles done to achieve a rating of 3 (slightly discoloured) | Number of cycles done to achieve a rating of 0 (strongly discoloured) |
|---|---|---|
| Example 1 | >25 | >40 |
| Example 2 | >25 | 40 |
| Example 3 | 3 | 12 |
| Example 4 | 3 | 8 |
| Example 5 | — | 5 |
| Example 6 | — | 10 |
| Example 7 | 20 | 36 |
| Example 8 | 8 | 16 |
| Example 20 | 12 | 30 |
| Example 21 | 12 | 36 |
| Example 22 | 12 | 26 |
| Example 23 | 12 | 30 |
| Example 24 | 20 | 36 |
| Example 25 | 10 | 40 |
| Example 26 | 8 | 40 |
| Example 27 | 40 | >40 |
| Example 28 | 38 | 38 |
| Example 29 | 7 | >35 |
| Example 30 | 7 | >35 |
| Example 31 | 22 | >35 |
| Example 32 | 16 | >37 |
| Example 33 | 16 | 40 |
| Example 34 | 7 | 37 |
| Comparative example 1 | <8 | <14 |
| Comparative example 2 | <8 | <14 |
| Comparative example 3 | 1 | <14 |
| Comparative example 4 | 1 | 5 |

The invention claimed is:

1. A process for making an aqueous coating composition comprising a cationic vinyl oligomer comprising the following steps:
   I. preparation of a cationic vinyl oligomer by solution or bulk polymerisation of components comprising:
      i) 2 to 50 wt % of vinyl monomers bearing amine functional groups selected from the group consisting of non-ionic amine functional groups (a), permanent quaternary ammonium functional groups (b), neutralised amine functional groups (c) and mixtures thereof;
      ii) 20 to 98 wt % of $C_1$ to $C_{18}$ alkyl (meth)acrylates;
      iii) 0 to 30 wt % of styrene based monomers;
      iv) 0 to 15 wt % of vinyl monomers bearing hydroxyl functional groups; and
      v) 0 to 15 wt % of vinyl monomers different from those from i), ii), iii) and iv);
   where i), ii), iii), iv) and v) add up to 100%; and
   II. dispersion of the cationic vinyl oligomer in an aqueous medium and neutralisation of non-ionic amine functional groups.

2. A process according claim 1 comprising an additional step III, the preparation of a cationic vinyl oligomer-polymer by emulsion polymerisation of vinyl monomers in the presence of the dispersed cationic vinyl oligomer prepared in step II; and wherein the weight % of the cationic vinyl oligomer is 1 to 70 wt % based on the weight of the cationic vinyl oligomer-polymer.

3. A process according to claim 2 wherein step III comprises the emulsion polymerisation of components comprising:
   i) 0 to 10 wt % of vinyl monomers bearing amine functional groups selected from the group consisting of non-ionic amine functional groups (a), permanent quaternary ammonium functional groups (b), neutralised amine functional groups (c) and mixtures thereof;
   ii) 40 to 100 wt % of $C_1$ to $C_{18}$ alkyl (meth)acrylates;
   iii) 0 to 30 wt % of styrene based monomers;
   iv) 0 to 15 wt % of vinyl monomers bearing hydroxyl functional groups; and
   v) 0 to 20 wt % of vinyl monomers different from those from i), ii), iii) and iv);
   where i), ii), iii), iv) and v) add up to 100%.

4. A process according to claim 2 wherein the weight % of the cationic vinyl oligomer is 5 to 55 wt % based on the weight of the cationic vinyl oligomer-polymer.

5. A process according to claim 1 wherein the weight average molecular weight of the cationic vinyl oligomer is $\leq 80{,}000$ g/mol.

6. A process according to claim 1 wherein the cationic vinyl oligomer is prepared by solution polymerisation.

7. A process according to claim 1 wherein the Tg of the cationic vinyl oligomer is in the range of from 30 to 100° C.

8. A process according to claim 2 wherein the Tg of the vinyl polymer is $\geq 30°$ C.

9. A process according to claim 2 wherein the cationic vinyl oligomer-polymer comprises less than 30 wt % of styrene based monomers based on the weight of the cationic vinyl oligomer-polymer.

10. A process according to claim 2 wherein the cationic vinyl oligomer-polymer comprises less than 15 wt % of hydroxyl functional monomers based on the weight of the cationic vinyl oligomer-polymer.

11. A process according to claim 1 wherein the aqueous coating composition comprises less than 1 wt % surfactant.

12. A process according to claim 1 wherein the cationic vinyl oligomer comprises in the range of from 0 to 5 wt % of vinyl monomers containing carboxylic acid functional groups.

13. A process according to claim 2 wherein the vinyl polymer comprises in the range of from 0 to 20 wt % of vinyl monomers containing carboxylic acid functional groups.

14. A substrate coated with an aqueous coating composition obtained from the process according to claim 1.

15. A substrate coated with a primer coating comprising an aqueous coating composition obtained from the process according to claim 1 and at least one top coating.

* * * * *